July 7, 1925.

R. RYCHIGER ET AL 1,544,686

APPARATUS FOR PRODUCING EDGED WORK

Filed Dec. 9, 1922

3 Sheets-Sheet 1

July 7, 1925.  
R. RYCHIGER ET AL  
1,544,686  
APPARATUS FOR PRODUCING EDGED WORK  
Filed Dec. 9, 1922   3 Sheets-Sheet 2

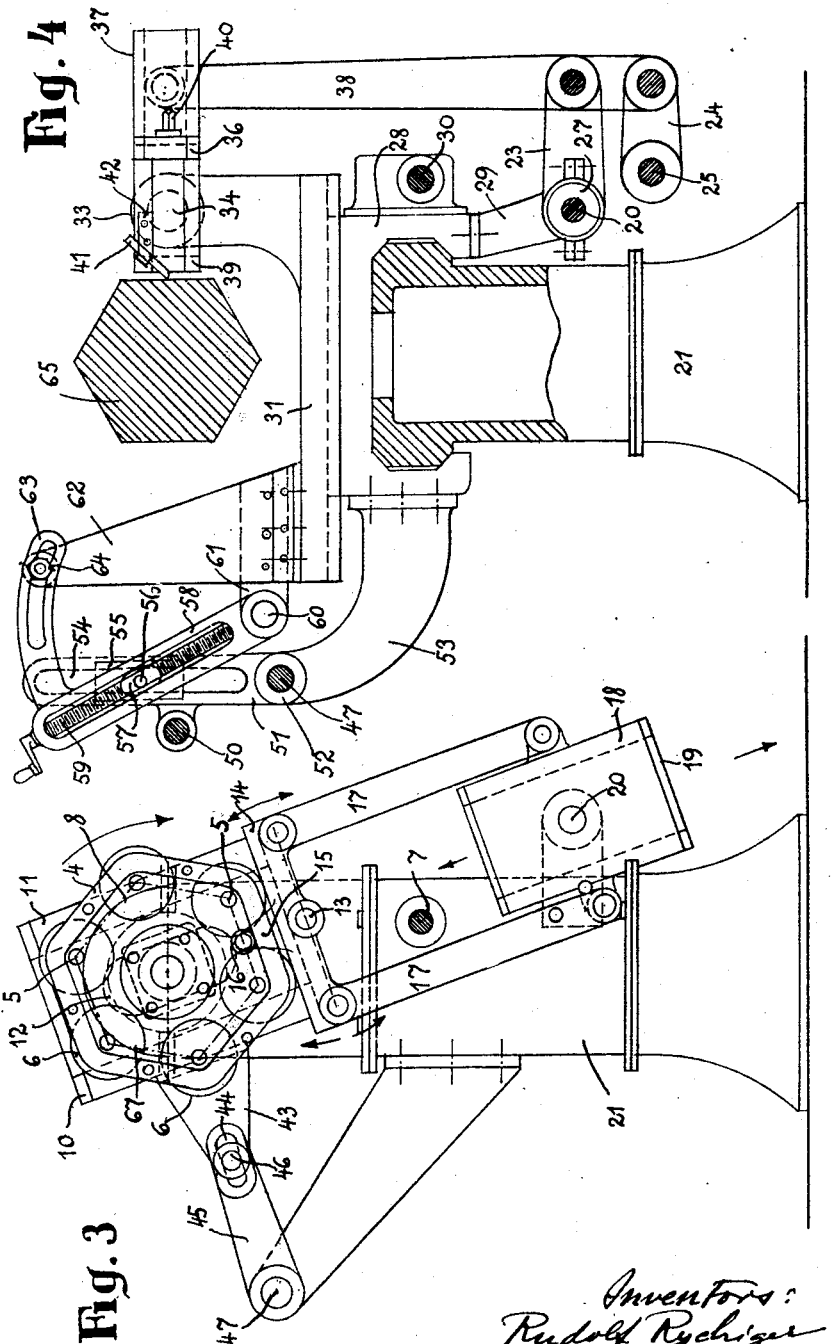

Patented July 7, 1925.

1,544,686

UNITED STATES PATENT OFFICE.

RUDOLF RYCHIGER AND ERNST KÜPFER, OF STEFFISBURG, SWITZERLAND.

APPARATUS FOR PRODUCING EDGED WORK.

Application filed December 9, 1922. Serial No. 605,835.

*To all whom it may concern:*

Be it known that we, RUDOLF RYCHIGER and ERNST KÜPFER, both Swiss citizens, residing at Steffisburg, Canton Bern, Switzerland, have invented certain new and useful Improvements in Apparatus for Producing Edged Work (for which we have filed application in Germany 10th January, 1922; Switzerland 26th April, 1922, and France, 8th April, 1922; Italy, 28th September, 1922), of which the following is a specification.

Our invention relates to improvements in apparatus for turning, boring, milling shaping and grinding edged work pieces to a pattern. Such apparatus are usually provided with a rotating pattern, which reciprocates and oscillates a copying lever, which in turn reciprocates and oscillates a tool lever arm adapted to move in the longitudinal direction of the machine and work piece.

In the apparatus according to our invention, the copying lever is mounted upon a cross slide which is arranged in a plane intersecting with the shaft of the pattern at right angles, and is moved up and down by the rotating pattern. The copying lever oscillates a shaft which is connected through a suitable lever mechanism with the tool slide adapted to move transversely to the work piece, the arms of the copying lever being movably connected with the tool lever arm, so as to cause same to oscillate synchronously.

Figure 1:
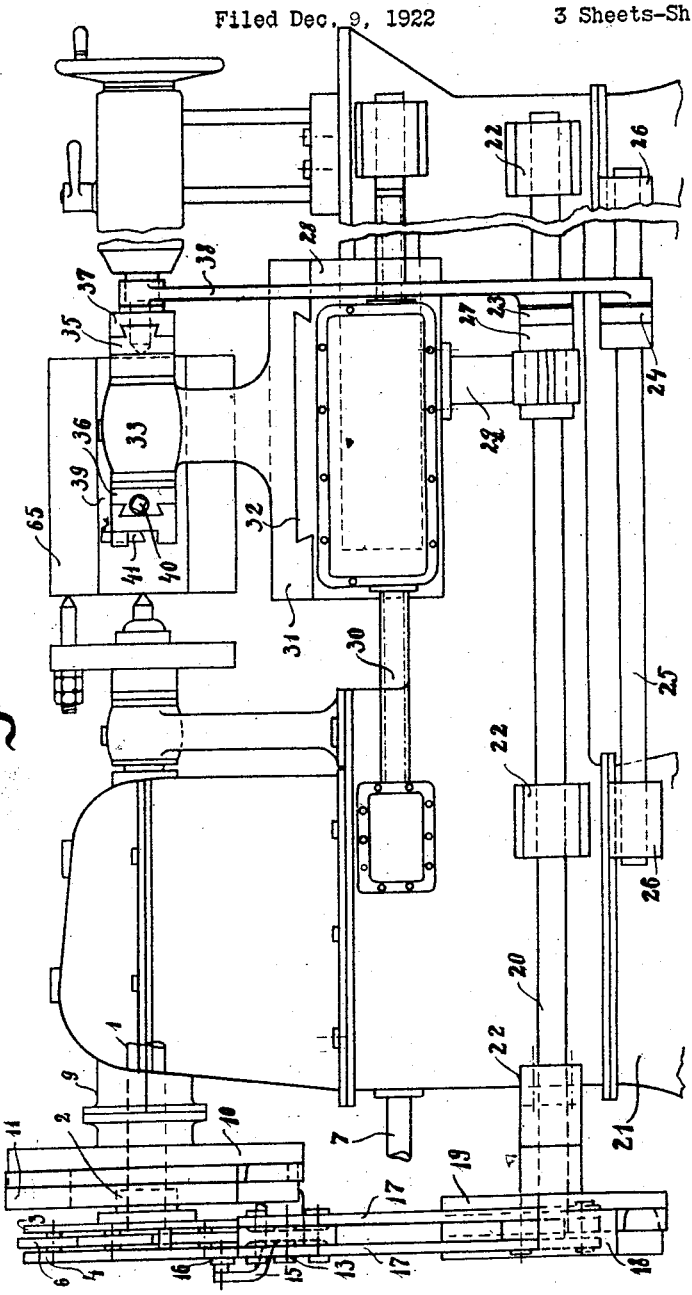
Figure 2:
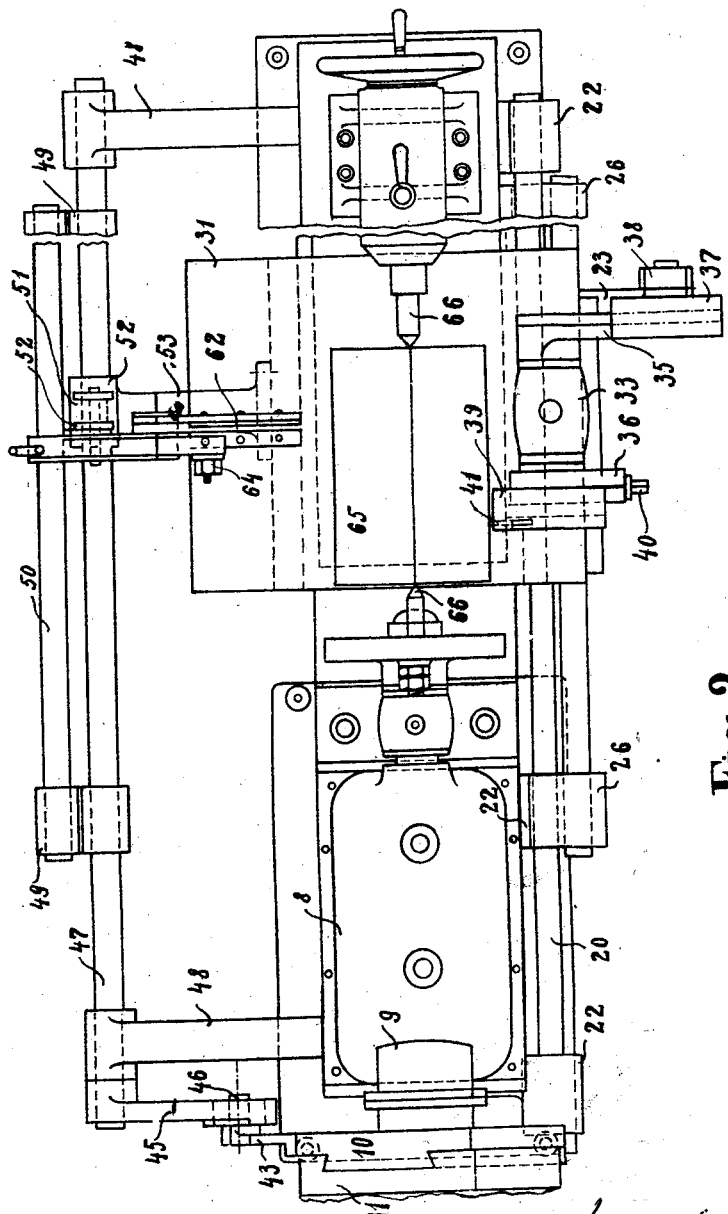

In the accompanying drawings showing by way of example one construction embodying the features of the present invention, Fig. 1 is an elevation of a lathe provided with the improved apparatus, Fig. 2 a plan, Fig. 3 an end view from the left hand side of Fig. 1 and Fig. 4 a section on line A—A of Fig. 2.

In the illustrated lathe the pattern is fixedly mounted by means of its hub 2 upon a rotating spindle 1, at the left hand side of the machine. The pattern comprises a hexagonal plate 3 fixed to the hub which carries a frame 4 and six studs 5 corresponding to the six edges of the work piece. Upon each stud is mounted a roller 6 which projects over the edge of the plate 3. The spindle 1 is driven from the shaft 7 by means not shown in the drawings, and projects from the gear casing 8 through the tubular extension 9 through a bore of the guide plate 10 fixed to the tubular extension 9. Upon the guide plate 10 is mounted a slide 11 which is provided with a longitudinal slot 12. The hub 2 of the pattern engages with this slot. Upon a pivot bolt 13 fixed to the slide 11 is oscillatably mounted a two-armed copying lever 14. This lever is provided with an arm 15 which takes over the frame 4 of the pattern and carries a roller 16 resting against the inner periphery of the frame 4. Two connecting rods 17 are pivoted to the two arms of the copying lever 14, the other ends of the rods being connected to a slide 18 which is slidably mounted upon a guide plate 19 fixed to the shaft 20. The shaft 20 is supported in three bearings 22 fixed to the lathe frame 21. The shaft 20 carries a one-armed lever 23 slidable upon the shaft. Another lever arm 24 is slidably mounted upon a shaft 25 which is supported in two bearings 26 mounted upon the lathe frame. The hub 27 of the lever arm 23 which is mounted upon the shaft 20, is carried by a bar 29 mounted upon the longitudinal slide 28 so that the lever arm 23 is carried by the longitudinal slide 28 when the latter travels. The movement of the slide is effected by a spindle 30. For the sake of clearness, this spindle is not shown in Fig. 2. The longitudinal slide 28 carries a tool slide 31 which is slidably mounted upon a guide plate 32 of the longitudinal slide 28. In a bearing 33 integral with the tool slide is mounted a shaft 34 which carries at each end a guide plate 35 and 36 respectively. The guide plate 35 carries a slide 37 which is movably connected by a connecting rod 38 with the lever arms 23, 24. Upon the guide plate 36 is mounted a tool holder 39 which may be adjusted upon the guide plate 36 by means of a spindle 40, and is adapted to carry a cutter 41. The guide plate 36 together with the tool holder 39 constitutes the tool lever arm. The cutter 41 is mounted in a groove of the tool holder 39 and is secured by means of a plate 42. Upon the copying lever slide 11 is provided a lateral arm 43. Into a guide slot 44 of this arm projects a pin 46 of the arm 45. This arm 45 is mounted upon a shaft 47 which is supported in two bearings 48 fixed to the lathe frame 21. The shaft 47 is rigidly connected to another shaft 50 by means of two lever arms 49. A slidable lever arm 51 is mounted upon the shafts 47, 50. The hub of the lever arm 51 is supported in a bearing 52, which is integral with a bracket 53 fixed to the longitudinal slide 28. In a guide slot 54 of the lever 51 is slidably mounted a cross piece 55 carrying a pivot 56. Upon this pivot is mounted a cross piece 57 which may be adjusted along a slotted guide rod 58 by means of a spindle 59 (Fig. 4). The guide bar 58 is pivotally mounted upon a pivot 60 carried by a bracket 61. The bracket 61 is riveted to a standard 62 fixed to the stool slide 31. The guide bar 58 is provided with a curved extension 63 which is fixed to the standard 62 by means of a screw 64 engaging a slot in the extension 63. In this manner the bar 58 may be adjusted angularly.

The operation is as follows:—

During the rotation of the pattern, the slide 11 is moved up and down in the directions indicated by arrows, and the copying lever 14 is oscillated as indicated by arrows. The movement of the coppying lever 14 is transmitted to the tool holder 39 and causes the latter to oscillate about the shaft 34. The slide 11 also oscillates the lever arm 51 and thus causes the bar 58 and the slide 31 to reciprocate transversely to the frame of the lathe so that the cutter 41 is not only oscillated but is also reciprocated transversely to the latter. The work piece 65 is held between the centre points 66.

The shape of the cross section of the work piece 65 corresponds to the hexagon 67 of the pattern indicated by dotted lines and has the same dimensions as the hexagon.

In the illustrated construction the transverse member of the tool slide 31 is given the movement of the slide 11 of the copying lever. The amplitude of the oscillation of the tool lever arm is identical with that of the arms of the copying lever 14. By suitably adjusting the transverse movement of the tool slide 31 and the oscillatory movement of the tool lever arm which is effected by adjusting the slide piece 55 and the tool holder 39, the size of the work piece may be made larger or smaller than that of the pattern hexagon. Before starting the operation, the screw 64 is loosened and the tool slide 31 is moved until the distance between axis of rotation of the tool lever arm and that of the work piece bears the same proportion to the distance between the axis of rotation of the pattern and the axis of rotation of the copying lever 14 as the diameter of the work piece to be produced to that of the pattern hexagon. The screw 64 is then tightened whereupon the longitudinal slide 28 may be moved by means of the spindle 30 during the machining of the work piece 65.

Instead of the illustrated pattern, any other suitable pattern may be used, having a larger or smaller number of corners.

While we have described the embodiments of our invention in great detail, we desire it to be understood that we do not desire to be limited to the exact details shown and described, as many changes may be made therein without departing from the spirit of our invention.

We claim:—

1. Apparatus for forming edged work pieces to a pattern, comprising in combination with the rotatable pattern and a shaft carrying the same, a copying lever adapted to be reciprocated and simultaneously oscillated by the said pattern, a tool lever arm movable longitudinally relative to the work piece and adapted to be reciprocated and oscillated by the said copying lever, a slide carrying the said copying lever and arranged in a plane at right angles to the shaft of the pattern and adapted to be moved up and down by the said pattern, a second shaft arranged to be oscillated by the said slide in both directions, a tool-slide movable transversely relative to the work piece, a lever mechanism connecting the said second shaft with the said tool-slide, the said tool lever arm being pivotally connected with the arms of the said copying lever.

2. The apparatus as specified in claim 1, comprising a third shaft actuated by the slide carrying the copying lever, a lever arm carried by the said third shaft, a bar mounted on the said tool slide, a slidable member connecting the said lever arm with the said bar, and means for adjusting the said slidable member, thereby adjusting the effective length of the said lever arm and the extent of the transverse movement of the said tool slide.

In testimony whereof we have hereunto set our hands in the presence of two witnesses.

RUDOLF RYCHIGER.
ERNST KÜPFER.

Witnesses:
A. BAILLEUX,
R. HEINGARTNER.